United States Patent
Hwang et al.

(10) Patent No.: US 12,416,269 B2
(45) Date of Patent: Sep. 16, 2025

(54) TURBOCHARGER CONTROL DEVICE FOR VEHICLE AND METHOD OF ESTIMATING BASE BOOST PRESSURE BY USING THE SAME

(71) Applicants: HYUNDAI MOTOR COMPANY, Seoul (KR); KIA CORPORATION, Seoul (KR)

(72) Inventors: Daewoong Hwang, Hwaseong-si (KR); Dong Hee Han, Hwaseong-si (KR); Minkyu Han, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/828,494

(22) Filed: Sep. 9, 2024

(65) Prior Publication Data
US 2025/0137412 A1 May 1, 2025

(30) Foreign Application Priority Data

Oct. 30, 2023 (KR) .................. 10-2023-0146286

(51) Int. Cl.
*F02D 41/00* (2006.01)
*F02D 41/14* (2006.01)
*F02D 41/20* (2006.01)

(52) U.S. Cl.
CPC ....... *F02D 41/0007* (2013.01); *F02D 41/145* (2013.01); *F02D 2041/2062* (2013.01); *F02D 2250/34* (2013.01)

(58) Field of Classification Search
CPC ................... F02D 41/145; F02D 41/0007
See application file for complete search history.

(56) References Cited

FOREIGN PATENT DOCUMENTS

GB         2493748 A  *  2/2013  ......... F02D 41/0072

* cited by examiner

*Primary Examiner* — Ngoc T Nguyen
(74) *Attorney, Agent, or Firm* — McDonnell Boehnen Hulbert & Berghoff LLP (57) ABSTRACT

Disclosed is a turbocharger control device of a vehicle and a method of estimating base boost pressure using the same. The turbocharger control device of a vehicle includes a status information collection unit for collecting real-time status information according to an operation of a turbocharger when a vehicle is operated from various types of sensors, and a control unit for precisely estimating a base boost pressure by excluding a turbocharger boost pressure from a current boost pressure through a turbine power function and a compressor power function based on a physical model based on the collected status information.

8 Claims, 6 Drawing Sheets

Prior Art

TURBOCHARGER CONTROL DEVICE FOR VEHICLE AND METHOD OF ESTIMATING BASE BOOST PRESSURE BY USING THE SAME

CROSS-REFERENCE TO RELATED APPLICATION

This application claims priority to and the benefit of Korean Patent Application No. 10-2023-0146286 filed in the Korean Intellectual Property Office on Oct. 30, 2023, the entire contents of which are incorporated herein by reference.

TECHNICAL FIELD

The present disclosure relates to a turbocharger control device of a vehicle and a method of estimating base boost pressure using the same, and more particularly, to a turbocharger control device for preventing overboost of a vehicle and a method of estimating base boost pressure by using the same.

BACKGROUND

In general, a turbocharger system of a vehicle serves to increase engine power by utilizing energy from exhaust gas emitted by an engine.

Figure 6:
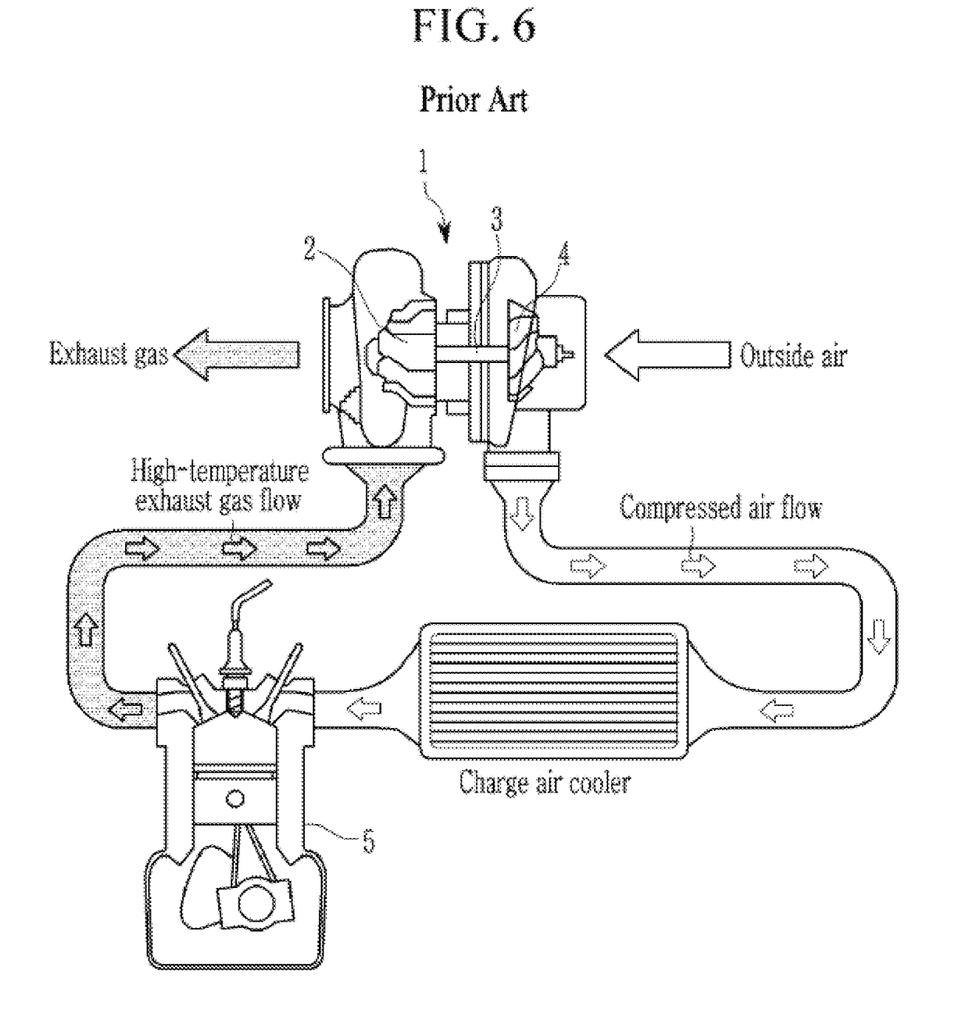
FIG. 6 is a diagram illustrating the configuration of a turbocharger system in the related art.

FIG. 6 illustrates the configuration of a turbocharger system in the related art.

Referring to FIG. 6, a turbocharger 1 in the related art rotates a turbine 2 by exhaust gas to generate rotational force, which is transmitted to a shaft 3 to rotate a compressor 4. Then, compressed air is supplied to a combustion chamber of an engine cylinder 5 by the compressor 4 to increase explosive force. Thus, a higher power output relative to the volume of the engine cylinder 5 may be obtained.

The turbocharger control in the related art (also referred to as "turbo control") is performed to follow a predetermined target boost pressure for an engine operating point and required torque. In this case, the main variables of the turbo control may include base boost pressure, target boost pressure, and current boost pressure. The current boost pressure is calculated by adding the influence of the turbocharger (e.g., turbocharger boost pressure) to the base boost pressure, and the turbo control is performed to follow the target boost pressure through the turbocharger.

The base boost pressure may exceed the target boost pressure in certain situations during the vehicle's operation. Since the turbocharger is unable to supply negative pressure to the cylinder, this may result in an overboost phenomenon in which the current boost pressure exceeds the target boost pressure. This overboost may cause damage to hardware, such as a shaft 3, and the turbo becomes uncontrollable, so the base boost pressure needs to be reduced by a throttle control to make the turbo controllable. Therefore, it is beneficial to accurately estimate the base boost pressure to prevent the overboost.

The related art estimates base boost pressure from a map according to engine rpm and outside air pressure. However, the base boost pressure estimation value in the related art can be inaccurate because it does not reflect variables, such as cylinder exhaust temperature, turbine discharge pressure, air flow rate, and compressor efficiency, and cannot exclude the influence of the turbocharger from the current boost pressure.

The matters described in the description of the related art are prepared to enhance the understanding of the background of the disclosure, and may include matters that are not already known to those skilled in the art to which the present technology belongs.

SUMMARY

The present disclosure provides a turbocharger control device of a vehicle, which, by using status information collected during an operation of the turbocharger of a vehicle, estimates base boost pressure more precisely by excluding an influence of a turbocharger through a turbine power function and a compressor power function based on a physical model. The disclosure also provides a method of estimating base boost pressure by using the same.

An exemplary embodiment of the present disclosure provides a turbocharger control device of a vehicle. The turbocharger control device includes a status information collection unit for collecting status information according to an operation of a turbocharger when a vehicle is operated, and a control unit for estimating a base boost pressure by excluding a turbocharger boost pressure from a current boost pressure through a turbine power function and a compressor power function based on the status information.

In some exemplary embodiments, the status information may include a flow rate of exhaust gas passing through a turbine, a temperature of exhaust gas upstream of the turbine, a temperature of exhaust gas downstream of the turbine, a flow rate of intake air passing through a compressor, a temperature of intake air upstream of the compressor, a temperature of intake air downstream of the compressor, a rotational speed of the compressor, or a pressure of intake air upstream of the compressor.

In some exemplary embodiments, the control unit may include a turbine power estimation module for estimating a turbine power minimum value by using a turbine power function based on the flow rate of the exhaust gas passing through the turbine, the temperature of the exhaust gas upstream of the turbine, and the temperature of the exhaust gas downstream of the turbine. The control unit also may include a compressor efficiency estimation module for estimating compressor efficiency by using an efficiency estimation function based on the flow rate of the intake air passing through the compressor, a rotational speed of the compressor, the temperature of the intake air upstream of the compressor, and the pressure of the intake air upstream of the compressor. The control unit also can include a compressor power estimation module for estimating a compressor power minimum value by substituting the compressor efficiency into a compressor power function reflecting the flow rate of the intake air passing through the compressor, the temperature of the exhaust gas upstream of the turbine, and the temperature of the exhaust gas downstream of the turbine. Further, the control unit can include a base boost pressure estimation module for estimating a base boost pressure via an inverse function of the compressor power function assuming that the turbine power minimum value and the compressor power minimum value are equal.

In some exemplary embodiments, the turbine power estimation module may determine the turbine power minimum value when a vane of the turbocharger is maximally open and the turbocharger boost pressure is smallest.

In some exemplary embodiments, the turbine power estimation module may determine turbine power according to the amount of opening of the vane of the turbocharger through the turbine power function and determines turbine power when the amount of opening of the vane is at maximum as the turbine power minimum value.

In some exemplary embodiments, the turbine power estimation module may determine turbine power when the amount of opening of the vane of the turbocharger is 85% as the turbine power minimum value.

In some exemplary embodiments, the control unit may determine an overboost phenomenon in which a base boost pressure exceeds a target boost pressure under a specific situation during an operation of the vehicle.

In some exemplary embodiments, the control unit may perform an overboost preventing control to reduce the base boost pressure by controlling the amount of opening of the throttle valve of an engine when the overboost occurs and place the turbocharger in a controllable region.

Another exemplary embodiment of the present disclosure provides a method of estimating a base boost pressure of a vehicle, the method includes collecting status information when a vehicle enters a turbo control-on status during an operation, estimating a turbine power minimum value by using a turbine power function reflecting a flow rate of exhaust gas passing through a turbine, a temperature of the exhaust gas upstream of the turbine, and a temperature of the exhaust gas downstream of the turbine of the status information, estimating compressor efficiency by constructing an efficiency estimation function for a flow rate of intake air passing through a compressor, a rotational speed of the compressor, a temperature of intake air upstream of the compressor, and a pressure of intake air upstream of the compressor of the status information, estimating a compressor power minimum value by substituting the compressor efficiency into a compressor power function reflecting the flow rate of the intake air passing through the compressor, the temperature of the exhaust gas upstream of the turbine, and the temperature of the exhaust gas downstream of the turbine of the status information, and estimating a base boost pressure via an inverse function of the compressor power function assuming that the turbine power minimum value and the compressor power minimum value are equal.

In some exemplary embodiments, estimating the turbine power minimum value may include determining the turbine power minimum value when a vane of the turbocharger is maximally open and the turbocharger boost pressure is smallest.

In some exemplary embodiments, the method may further include determining that an overboost has occurred when the base boost pressure exceeds a target boost pressure after the estimating of the base boost pressure, and performing overboost preventing control, when the overboost occurs, to reduce the base boost pressure by controlling the amount of opening of a throttle valve to place the turbocharger in a controllable region.

According to the exemplary embodiment of the present disclosure, it is possible to derive a more precise base boost pressure by excluding the influence of a compression value of the turbocharger from the current boost pressure through the turbine power function and the compressor power function based on the physical model.

In addition, it is possible to prevent damage to the hardware by detecting an overboost phenomenon that exceeds the target boost pressure through the precise base boost pressure and performing the overboost preventing control to reduce the base boost pressure by controlling the throttle valve.

In addition, it is possible to perform more robust turbo control by placing the turbocharger system in the turbo-controllable region through the overboost preventing control using the precise base boost pressure.

DETAILED DESCRIPTION

Hereinafter, exemplary embodiments of the present disclosure will be described with reference to accompanying drawings so as to be easily understood by a person ordinary skilled in the art.

The terms used herein are for the purpose of describing specific exemplary embodiments, and are not intended to limit the present disclosure. As used herein, singular expressions include plural expressions unless they have definitely opposite meanings. The terms "include" and/or "including" specify the presence of the mentioned characteristics, integers, operations, operations, constituent elements, and/or components when used in the present specification, but it will also be understood that this does not exclude the presence or addition of one or more of other characteristics, integers, operations, operations, constituent elements, components, and/or groups thereof. As used herein, the term "and/or" includes any one or any combination of the items listed in connection therewith.

Throughout the specification, in describing the constructional elements of the present disclosure, the terms of a first, a second, A, B, (a), (b), or the like, may be used, but the constituent elements shall not be limited by the terms. Such a term is for discriminating the constructional element from another constructional element, and does not limit the feature, order, or sequence of the constructional element, or the like.

It should be understood that when one constituent element is referred to as being "coupled to" or "connected to" another constituent element, one constituent element may be directly coupled to or connected to the other constituent element, but intervening elements may also be present. In contrast, when one constituent element is "directly coupled to" or "directly connected to" another constituent element, it should be understood that there are no intervening element present.

The term used in the present specification is simply used for describing a specific exemplary embodiment and does not intend to limit the present disclosure. A singular expression includes a plural expression unless it is specifically described to the contrary in the context.

In addition, it is understood that one or more of the methods below or the aspects thereof may be executed by at least one or more controllers. The term "controller" may refer to a hardware device including a memory and a processor. The memory is configured to store program commands, and the processor is specially programmed so as to execute program commands to perform one or more processes described in more detail below. The controller may control operations of units, modules, components, devices, or similar matters thereof as described herein. Further, it is understood that the following methods may be executed by a device including a controller together with one or more other components as recognized by those skilled in the art.

As the present disclosure relates to a turbocharger that supplies compressed air to a combustion chamber of an engine, the terms overboost, base boost, target boost, current boost, and the like, used throughout the specification are understood to refer to the respective compression/pressure.

Hereinafter, a turbocharger control device of a vehicle according to an exemplary embodiment of the present disclosure and a method of estimating base boost pressure by using the same will be described in detail with reference to the accompanying drawings.

Figure 1:
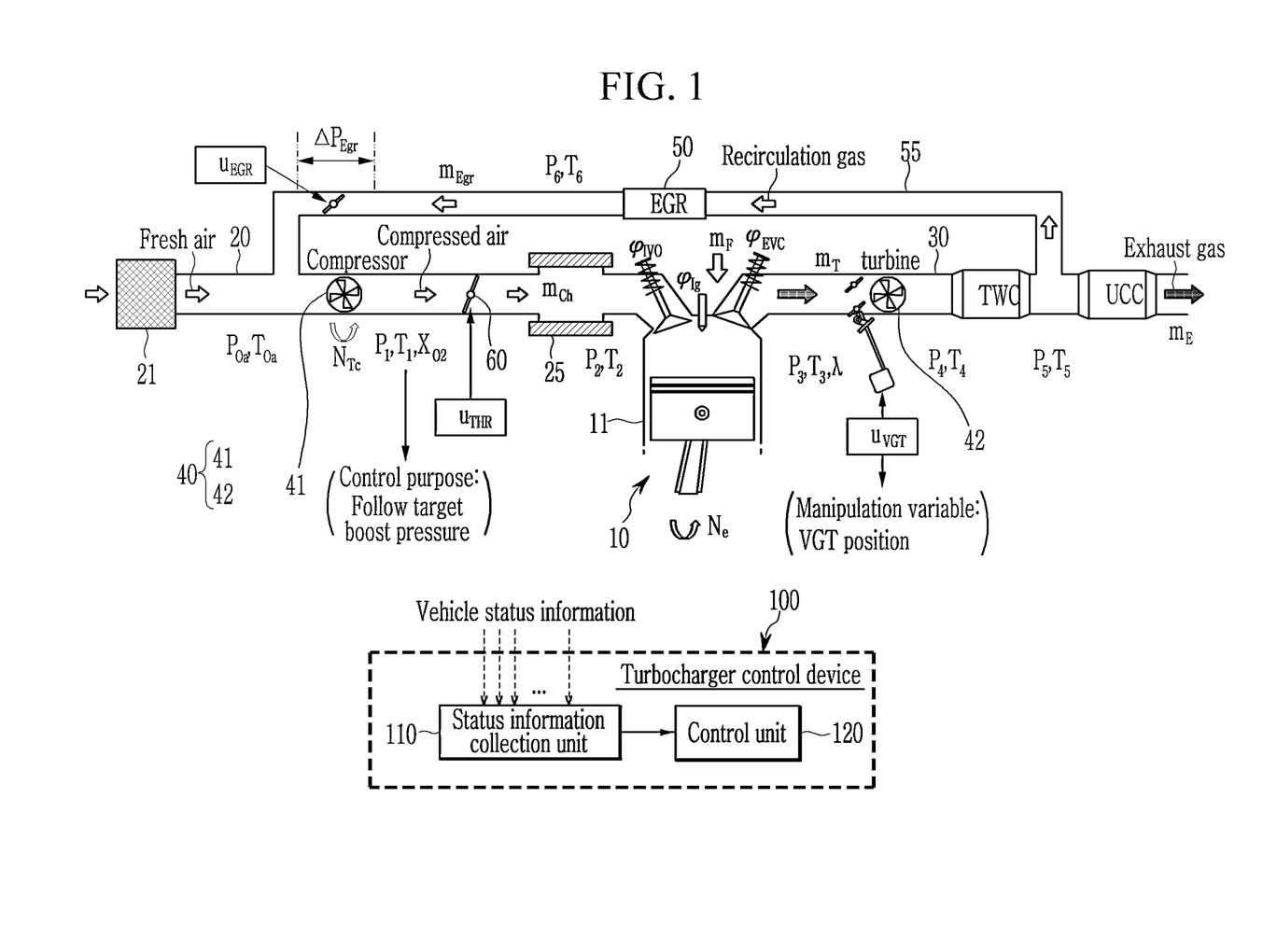
FIG. 1 is a diagram illustrating a turbocharger control device applied to a turbocharger system of a vehicle according to an exemplary embodiment of the present disclosure.

FIG. 1 is a diagram illustrating a turbocharger control device applied to a turbocharger system of a vehicle according to an exemplary embodiment of the present disclosure.

Referring to FIG. 1, a turbocharger system of a vehicle according to an exemplary embodiment of the present disclosure includes an engine 10 including a plurality of cylinders 11 that generate driving force by combustion of fuel, an intake line 20 supplying fresh air (outside air) to the cylinders 11 through an air filter 21, an exhaust line 30 through which exhaust gas discharged from the cylinder 11 flows, a turbocharger 40 that compresses the fresh air supplied to cylinder 11 and the recirculated exhaust gas, an exhaust gas recirculation apparatus (EGR) 50 that recirculates exhaust gas discharged from the cylinder 11 through a recirculation line 55, and a turbocharger control device 100 that controls the overall operation of the turbocharger system according to driving of the vehicle.

The intake line 20 is provided with an intercooler 25 that cools the compressed air entering the cylinder 11.

The exhaust line 30 is provided with an emission reduction device that purifies various potentially harmful substances contained in the exhaust gas discharged from the cylinder 11. For example, the emission reduction device may include a three way catalyst (TWC) and an under floor catalytic converter (UCC).

The turbocharger 40 may be configured as a variable geometry turbocharger (VGT). The turbocharger 40 rotates a turbine 41 with exhaust gas and transmits the generated rotational force to a compressor 42 connected via the shaft to compress the fresh air and recirculated exhaust gas. The turbocharger 40 supplies the compressed air to the cylinder 11 of the engine 10 to increase explosive force, thereby obtaining high power relative to a volume.

In FIG. 1, $P_{Oa}$ is the pressure or intake pressure upstream of the compressor, $T_{Oa}$ is the intake temperature upstream of the compressor, $P_1$ is the pressure downstream of the compressor, $T_1$ is the temperature downstream of the compressor, $X_{o2}$ is the oxygen concentration downstream of the compressor, $u_{THR}$ is the amount of opening of the throttle valve, $P_2$ is the pressure downstream of the throttle valve, $T_2$ is the temperature downstream of the throttle valve, $m_{ch}$ is the flow rate of the intake air supplied to the cylinder, $m_F$ is the amount of fuel injected into the cylinder, IVO is the intake valve opening timing, EVC is the exhaust valve closing timing, IG is the ignition timing, $P_3$ is the exhaust pressure of the exhaust gas discharged from the cylinder, $T_3$ is the exhaust temperature of the exhaust gas discharged from the cylinder, $\Lambda$ is the value of the lambda sensor, $u_{VGT}$ is the amount of opening of the vane, $P_4$ is the pressure downstream of the turbine, $T_4$ is the temperature downstream of the turbine, $P_5$ is the pressure downstream of the TWC, $T_5$ is the temperature downstream of TWC, $m_E$ is the flow rate of exhaust gas discharged from the turbocharger system, $m_{Egr}$ is the flow rate of EGR gas, and $U_{EGR}$ is the status information indicative of the amount of opening of the EGR valve.

The status information may be named upstream or downstream depending on the sensing location relative to a particular component. For example, $P_1$ may be referred to as pressure $P_1$ downstream of the compressor relative to the compressor 42 and pressure $P_1$ upstream of the throttle relative to the throttle 60. Other undefined symbols may be understood as information generally or publicly known in the art of the present disclosure.

The turbocharger control device 100 may freely control pressurized air pressure by the turbocharger through the control of the amount of opening ($u_{THR}$) of the throttle valve according to the configuration of the VGT 40, thereby realizing the effects of low emissions and fuel efficiency improvement under partial load conditions of the engine.

The turbocharger control device 100 performs turbo control to follow a predetermined target boost pressure based on the engine operating point and required torque when the vehicle is in operation. In this case, the turbocharger control device 100 may calculate the current boost pressure by adding an influence of the turbocharger (hereinafter referred to as "turbocharger boost pressure") to the base boost pressure (e.g., current boost pressure=base boost pressure+turbocharger boost pressure). The turbocharger 40 may then perform turbo control to ensure that the current boost pressure follows the target boost pressure.

The turbocharger control device 100 includes a status information collection unit 110 and a control unit 120.

The status information collection unit 110 collects real-time status information from various types of sensors according to the operation of the turbocharger 40 during the operation of the vehicle and transmits the collected status information to the control unit 120. For example, the status information may include a turbine flow rate, a temperature upstream of the turbine, a temperature downstream of the turbine, a compressor flow rate, a temperature upstream of the compressor, a temperature downstream of the compressor, a rotational speed of the compressor, and a pressure upstream of the compressor. Here, the sensors may include physical sensors and software sensors that derive detection signals through computation using multiple measurement elements.

The control unit 120 estimates a precise base boost pressure based on minimum turbine power by using the status information collected via the status information collection unit 110 to prevent overboosting of the turbocharger 40.

Figure 2:
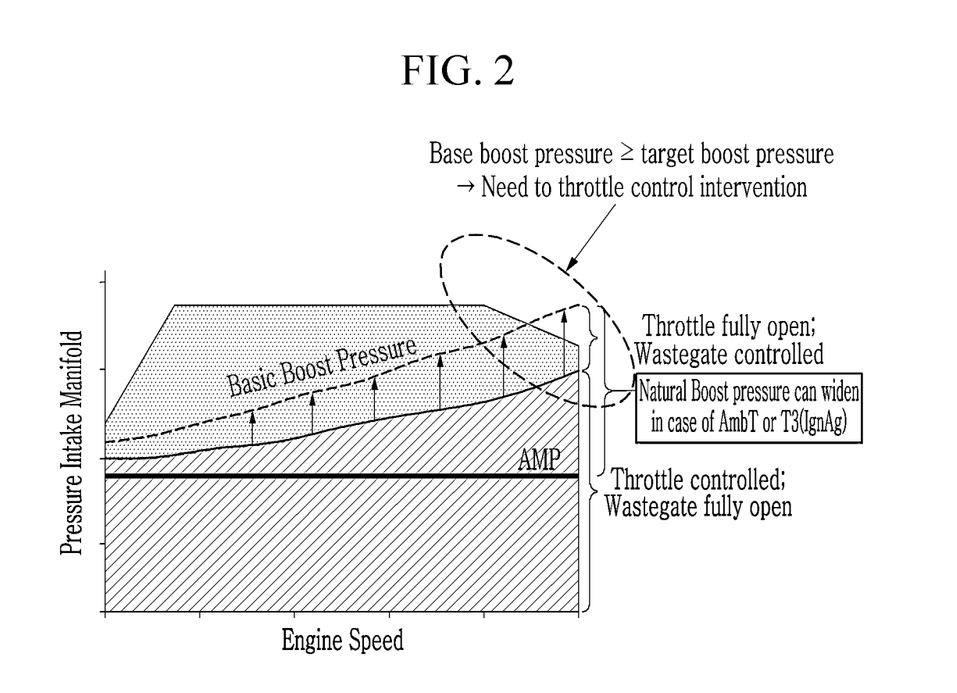
FIG. 2 is a graph illustrating a state in which a base boost pressure exceeds a target boost pressure according to the exemplary embodiment of the present disclosure.

FIG. 2 is a graph illustrating a state in which a base boost pressure exceeds a target boost pressure according to the exemplary embodiment of the present disclosure.

Referring to FIG. 2, the control unit 120 detects an overboost phenomenon in which a base boost pressure exceeds a target boost pressure in a specific situation (e.g., when the engine speed is (e.g., very) high, when the vehicle is traveling at high altitudes where oxygen is sparse, when the vehicle is traveling in winter conditions with a high air compression ratio, when the ignition timing of the vehicle is adjusted to shift, and the like) during the operation of the vehicle. Overboosting may damage the hardware of the turbocharger 40 and cause problems that place the turbocharger 40 in an uncontrollable region.

Therefore, the control unit 120 performs overboost preventing control by adjusting the amount of throttle valve opening ($u_{THR}$) of the engine in the event of the overboost phenomenon to reduce the base boost pressure and place the turbocharger in a controllable region. For the overboost preventing control, it is useful to precisely estimate the base boost pressure.

Therefore, the control unit 120 according to the exemplary embodiment of the present disclosure may estimate a base boost pressure more precisely by excluding the turbocharger boost pressure (i.e., the influence of the turbocharger) from the current boost pressure through a physical model-based turbine power function and a compressor power function based on the status information collected through the status information collection unit 110.

Figure 3:
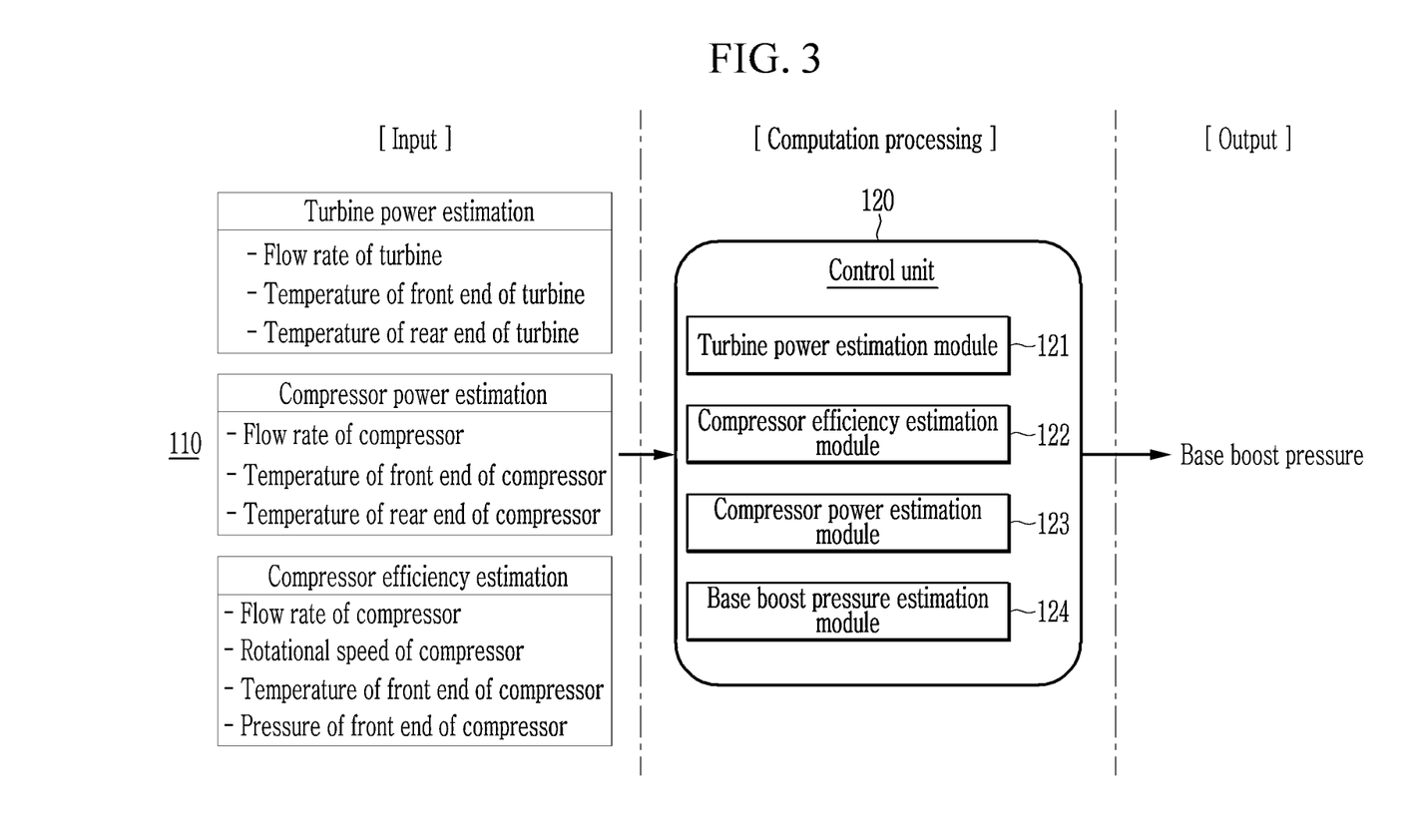
FIG. 3 is a block diagram illustrating a detailed configuration of a control unit according to the exemplary embodiment of the present disclosure.

FIG. 3 is a block diagram illustrating a detailed configuration of the control unit according to the exemplary embodiment of the present disclosure.

Referring to FIG. 3, the control unit 120 according to the exemplary embodiment of the present disclosure includes a turbine power estimation module 121, a compressor efficiency estimation module 122, a compressor power estimation module 123, and a base boost pressure estimation module 124.

The turbine power estimation module 121 estimates a turbine power minimum value by using a turbine power function that reflects the exhaust gas flow rate passing through the turbine, the exhaust gas temperature upstream of the turbine, and the exhaust gas temperature downstream of the turbine, input from the status information collection unit 110.

The turbine power function is derived from the gas equation and may be constructed as shown in Equation 1 using the exhaust gas temperature upstream of the turbine of the turbocharger 40 ($T_{TrbIn}$), the exhaust gas temperature downstream of the turbine ($T_{TrbOut}$), the specific heat value of the exhaust gas ($C_{pExh}$), and the flow rate ($m_{trb}$) of the exhaust gas passing through the turbine (the flow rate of the exhaust gas passing through the turbine).

$$P_t = c_{pExh} \cdot m_{Trb}(T_{TrbIn} - T_{TrbOut}) = \qquad \text{Equation 1}$$
$$\eta_T c_{pExh} \cdot m_{Trb} \cdot T_{trbIn}\left(1 - \left[\frac{p_3}{p_4}\right]^{\frac{1-\gamma}{\gamma}}\right)$$

In Equation 1, Pt is the turbine power, $m_{trb}$ is the flow rate of the exhaust gas passing through the turbine, $T_{TrbIn}$ is the temperature of the exhaust gas upstream of the turbine, $T_{TrbOut}$ is the temperature of the exhaust gas downstream of the turbine, $C_{pExh}$ is the specific heat of the exhaust gas, $P_3$ is the pressure of the exhaust gas upstream of the turbine, $P_4$ is the pressure of the exhaust gas downstream of the turbine, $\eta_T$ is the efficiency of the turbine, and $\gamma$ is the calibration constant.

The turbine power estimation module 121 may calculate the turbine power ($P_t$) by using the turbine power model, and calculate the turbine power minimum value ($P_t=P_{TrbLo}$) when the vane of the turbocharger 40 is maximally open and the turbocharger boost pressure is smallest. Here, the reason for calculating the turbine power minimum value is to exclude the influence of the turbocharger on the current boost pressure.

In other words, the turbine power estimation module 121 may calculate the turbine power according to the amount of opening of the vane of the turbocharger 40 through a turbine power function (e.g., Equation 1).

Figure 4:
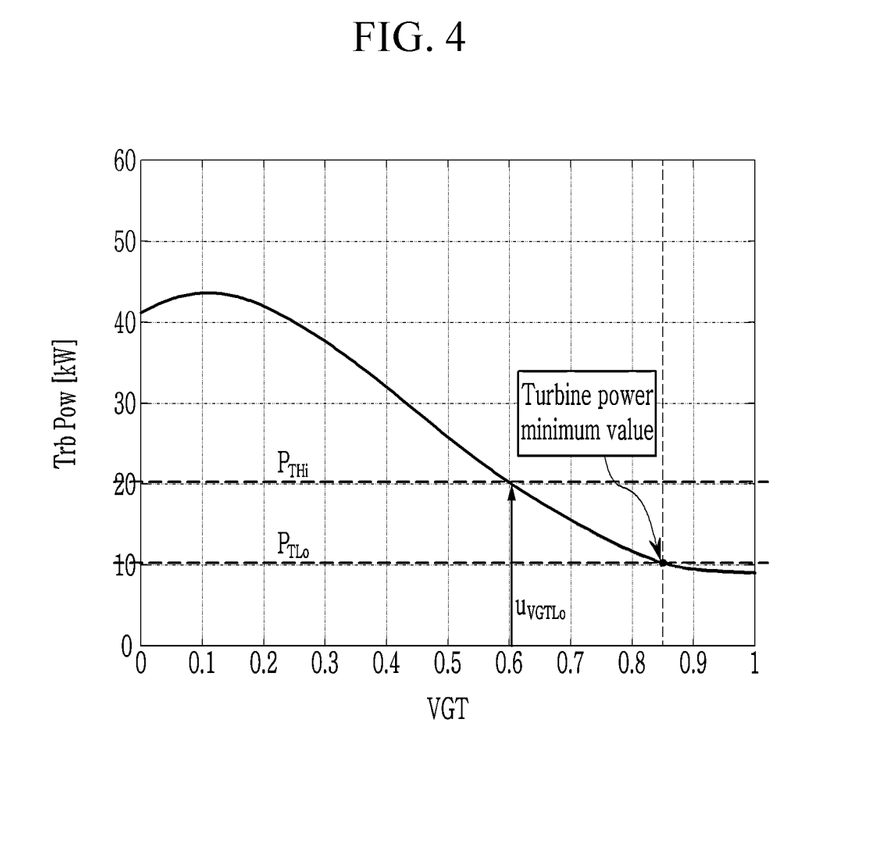
FIG. 4 is a graph illustrating a turbine power model according to an exemplary embodiment of the present disclosure.

FIG. 4 is a graph illustrating a turbine power model according to an exemplary embodiment of the present disclosure.

Referring to FIG. 4, the turbine power estimation module 121 may represent the turbine power model based on the physical model in a form of a graph and derive the turbine power minimum value ($P_{TrbLo}$) from the graph.

FIG. 4 illustrates turbine power according to the amount of opening of the vane ($u_{VGT}$) when the turbine is at a constant speed. The turbine power estimation module 121 may determine the turbine power when the amount of opening of the vane ($u_{VGT}$) of the turbocharger 40 is maximum (e.g., 85%) as the turbine power minimum value ($P_{TrbLo}$).

Equation 2 below is a compressor power function constructed based on a physical model.

$$P_{CmprLo} = c_p \cdot m_{Ch} \cdot T_{0a}\left(\left(\frac{p_{1min}}{p_{0a}}\right)^{\frac{\gamma-1}{\gamma}} - 1\right) \cdot \frac{1}{\eta(m_{Ch}, N_c, T_{0a}, p_{0a})} \qquad \text{Equation 2}$$

In Equation 2, $P_{CmprLo}$ is the compressor power minimum value, $C_p$ is the specific heat of the intake air, $m_{Ch}$ is the flow rate of the intake air passing through the compressor, $T_{0a}$ is the temperature of the intake air upstream of the compressor, $P_{1min}$ is the base boost pressure, $P_{0a}$ is the pressure of the intake air upstream of the compressor, $N_c$ is the rotational speed of the compressor, $\eta$ is the compressor efficiency, $P_{1min}$ is the base boost pressure, and $\gamma$ is the calibration constant.

In Equation 2, $\eta(m_{Ch}, N_c, T_{0a}, P_{0a})$ is an efficiency estimation function to determine the compressor efficiency, and the compressor efficiency may be determined by the efficiency estimation function determined by the flow rate ($m_{Ch}$) of the intake air passing through the compressor, the rotational speed ($N_c$) of the compressor, the temperature ($T_{0a}$) of the intake air upstream of the compressor, and the pressure ($P_{0a}$) of the intake air upstream of the compressor.

The compressor efficiency estimation module 122 estimates the compressor efficiency ($\eta$) by constructing a physical model for the flow rate ($m_{ch}$) of the intake air passing through the compressor, the rotational speed ($N_c$) of the compressor, the temperature of the intake air upstream of the compressor ($T_{0a}$), and the pressure of the intake air upstream of the compressor ($P_{0a}$) input from the status information collection unit 110.

The compressor efficiency is estimated by the flow rate ($m_{Ch}$) of the intake air passing through the compressor, the rotational speed ($N_c$) of the compressor, the temperature ($T_{0a}$) of the intake air upstream of the compressor, and the pressure of the intake air upstream of the compressor ($P_{0a}$), the compressor efficiency according to the flow rate ($m_{Ch}$) of the intake air passing through the compressor, the rotational speed ($N_c$) of the compressor, the temperature ($T_{0a}$) of the intake air upstream of the compressor, and the pressure of the intake air upstream of the compressor ($P_{0a}$) may be pre-stored in the compressor efficiency estimation module 122 in the form of map data.

The compressor power estimation module 123 estimates a compressor power minimum value ($P_{ComrLo}$) by substituting the compressor efficiency ($\eta$) into the compressor power function reflecting the flow rate ($m_{ch}$) of the intake air passing through the compressor, the exhaust gas temperature ($T_{0a}$) upstream of the turbine, and the exhaust gas temperature ($T_1$) downstream of the turbine input from the status information collection unit 110.

The base boost pressure estimation module 124 estimates a base boost pressure (P1min) through the inverse function of the compressor power function (e.g., Equation 2) assuming that the turbine power minimum value ($P_{TrbLo}$) and the compressor power minimum value ($P_{ComrLo}$) are equal.

The inverse function of the compressor power function (e.g., Equation 2) may be constructed as shown in Equation 3 below.

$$p_{1min} = \frac{c \cdot P_{CmprLo} \cdot \eta + a \cdot c_p \cdot m_{Ch} \cdot T_{0a}}{a \cdot c_p \cdot m_{Ch} \cdot T_{0a} - b \cdot c \cdot P_{CmprLo} \cdot \eta} \cdot p_{0a} \qquad \text{Equation 3}$$

In Equation 3, $P_{1min}$ is the base boost pressure, $P_{CmprLo}$ is the compressor power minimum value, $C_p$ is the specific heat of the intake air, $m_{Ch}$ is the flow rate of the intake air passing through the compressor, $T_{0a}$ is the temperature of the intake air upstream of the compressor, $\eta$ is the compressor efficiency, and a, b, and c are constants.

Here, the turbine 41 and the compressor 42 of the turbocharger 40 are connected through the shaft so that the turbine power is transferred as the compressor power, and it may be assumed that the turbine power minimum value ($P_{TrbLo}$) is equal to the compressor power minimum value ($P_{ComrLo}$) because the loss due to friction is not large when the turbine power is at the turbine power minimum value ($P_{TrbLo}$).

Thus, the base boost pressure estimation module 124 may calculate the base boost pressure $P_{1min}$ by substituting the previously calculated compressor efficiency ($\eta$) and compressor power minimum value ($P_{ComrLo}$), and the pressure of the intake air upstream of the compressor ($P_{0a}$), the flow rate ($m_{ch}$) of the intake air passing through the compressor, the temperature ($T_{0a}$) of the intake air upstream of the compressor, and the specific heat ($C_p$) of the intake air into Equation 3.

The control unit 120 is implemented as a computing device, such as an electronic control unit, and stores at least one program and data for the overboost preventing control of the turbocharger 40 in its memory. For example, the control unit 120 may store a minimum turbine power based base boost pressure estimation program (algorithm) for the overboost prevention and perform a base boost pressure estimation method according to the execution thereof.

As such, the control unit 120 may be implemented as one or more processors operated by a set program, and the set program may be programmed to perform each operation of the base boost pressure estimation method according to the exemplary embodiment of the present disclosure.

The base boost pressure estimation method will be described in more detail with reference to the drawings below.

Figure 5:
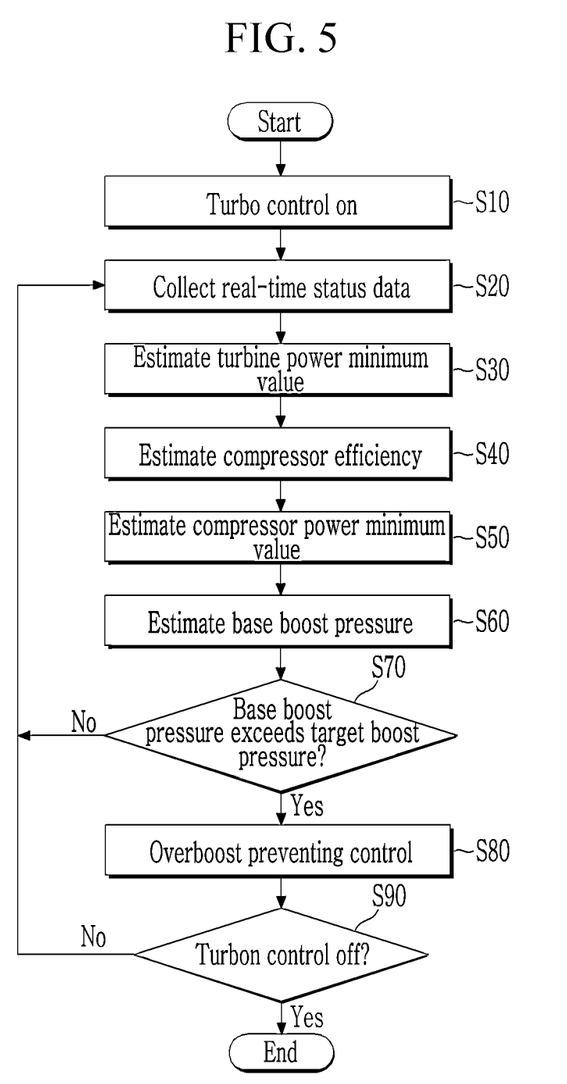
FIG. 5 is a flow diagram schematically illustrating a base boost pressure estimation method according to the exemplary embodiment of the present disclosure.

FIG. 5 is a flow diagram schematically illustrating the base boost pressure estimation method according to the exemplary embodiment of the present disclosure.

Referring to FIG. 5, when the turbocharger control device 100 enters a turbo control-on status during an operation of a vehicle (S10), the turbocharger control device 100 collects real-time status information for estimating a base boost pressure (S20).

The turbocharger control device 100 estimates a turbine power minimum value by using a turbine power function that reflects a turbine flow rate, a temperature upstream of the turbine, and a temperature downstream of the turbine from the status information (S30).

The turbocharger control device 100 estimates compressor efficiency ($\eta$) based on a flow rate ($m_{ch}$) of intake air passing through the compressor, a rotational speed ($N_c$) of the compressor, a temperature ($T_{0a}$) of the intake air upstream of the compressor, and a pressure ($P_{0a}$) of the intake air upstream of the compressor in the status information (S40).

The turbocharger control device 100 estimates a compressor power minimum value ($P_{ComrLo}$) by substituting the compressor efficiency ($\eta$) into the compressor power function reflecting the flow rate ($m_{ch}$) of the intake air passing through the compressor, the exhaust gas temperature ($T_{0a}$) upstream of the turbine, and the exhaust gas temperature (T1) downstream of the turbine in the status information (S50).

The turbocharger control device 100 estimates a base boost pressure ($P_{1min}$) in which a turbocharger boost pressure is excluded through an inverse function of the compressor power function (e.g., Equation 2) assuming that the turbine power minimum value ($P_{TrbLo}$) and the compressor power minimum value ($P_{ComrLo}$) are equal (S60).

The turbocharger control device 100 compares the base boost pressure (P1min) and the target boost pressure to determine whether an overboost situation has occurred (S70).

In this case, the turbocharger control device 100 determines that the overboost situation does not occur when the base boost pressure ($P_{1min}$) does not exceed the target boost pressure (S70; NO), and returns to operation S20 to continue calculating the base boost pressure until the turbo control is off.

The turbocharger control device 100 determines that an overboost situation occurs when the base boost pressure ($P_{1min}$) exceeds the target boost pressure (S70; YES), and immediately performs an overboost preventing control to reduce the base boost pressure by controlling the amount of opening of the throttle value (uTHR) and to place the turbocharger 40 in a controllable region (S90).

The turbocharger control device 100 repeats the base boost pressure estimation process until the turbo control is off (S90; NO) and terminates the base boost pressure estimation process when the turbo control is off (S90; YES).

According to the exemplary embodiment of the present disclosure, there is the effect in that it is possible to derive a precise base boost pressure by excluding the influence of the boost pressure of the turbocharger from the current boost pressure through the turbine power function and the compressor power function based on the physical model.

In addition, it is possible to prevent or minimize damage to the hardware by detecting an overboost phenomenon that exceeds the target boost pressure through the precise base boost pressure and performing the overboost preventing control to reduce the base boost pressure by controlling the throttle valve.

In addition, it is possible to perform robust turbo control by placing the turbocharger system in the turbo-controllable region through the overboost preventing control using the precise base boost pressure.

The exemplary embodiment of the present disclosure is implemented through the device and/or method described above, and may also be implemented through a program for implementing a function corresponding to the configuration of the exemplary embodiment of the present disclosure, a recording medium in which the program is recorded, and the like, and the implementation may be easily realized by those skilled in the art based on the description of the exemplary embodiment.

Although an exemplary embodiment of the present disclosure has been described in detail, the scope of the present disclosure is not limited by the exemplary embodiment. Various changes and modifications using the basic concept of the present disclosure defined in the accompanying claims by those skilled in the art shall be construed to belong to the scope of the present disclosure.

What is claimed is:

1. A turbocharger control device of a vehicle, the turbocharger control device comprising:
   a status information collection unit for collecting status information according to an operation of a turbocharger when a vehicle is operated; and
   a control unit for estimating a base boost pressure by excluding a turbocharger boost pressure from a current boost pressure through a turbine power function and a compressor power function based on the status information,
   wherein the control unit determines an overboost phenomenon in which the base boost pressure exceeds a target boost pressure under a specific situation during an operation of the vehicle, and
   wherein the control unit performs an overboost preventing control to reduce the base boost pressure by controlling an amount of opening of a throttle valve of an engine when the overboost occurs and places the turbocharger in a controllable region.

2. The turbocharger control device of claim 1, wherein the status information includes
   a flow rate of exhaust gas passing through a turbine, a temperature of exhaust gas upstream of the turbine, a temperature of exhaust gas downstream of the turbine, a flow rate of intake air passing through a compressor, a temperature of intake air upstream of the compressor, a temperature of intake air downstream of the compressor, a rotational speed of the compressor, a pressure of intake air upstream of the compressor.

3. The turbocharger control device of claim 2, wherein the control unit includes:
   a turbine power estimation module for estimating a turbine power minimum value by using a turbine power function based on the flow rate of the exhaust gas passing through the turbine, the temperature of the exhaust gas upstream of the turbine, and the temperature of the exhaust gas downstream of the turbine;
   a compressor efficiency estimation module for estimating compressor efficiency by using an efficiency estimation function based on the flow rate of the intake air passing through the compressor, a rotational speed of the compressor, the temperature of the intake air upstream of the compressor, and the pressure of the intake air upstream of the compressor;
   a compressor power estimation module for estimating a compressor power minimum value by substituting the compressor efficiency into a compressor power function reflecting the flow rate of the intake air passing through the compressor, the temperature of the exhaust gas upstream of the turbine, and the temperature of the exhaust gas downstream of the turbine; and
   a base boost pressure estimation module for estimating a base boost pressure via an inverse function of the compressor power function assuming that the turbine power minimum value and the compressor power minimum value are equal.

4. The turbocharger control device of claim 3, wherein the turbine power estimation module determines the turbine power minimum value when a vane of the turbocharger is maximally open and the turbocharger boost pressure is smallest.

5. The turbocharger control device of claim 3, wherein the turbine power estimation module determines turbine power according to an amount of opening of a vane of the turbocharger through the turbine power function, and determines turbine power when the amount of opening of the vane is at maximum as the turbine power minimum value.

6. The turbocharger control device of claim 5, wherein the turbine power estimation module determines turbine power when the amount of opening of the vane of the turbocharger is 85% as the turbine power minimum value.

7. A method of estimating a base boost pressure, the method comprising:
   collecting status information when a vehicle enters a turbo control-on status during an operation;
   estimating a turbine power minimum value by using a turbine power function reflecting a flow rate of exhaust gas passing through a turbine, a temperature of the exhaust gas upstream of the turbine, and a temperature of the exhaust gas downstream of the turbine of the status information;
   estimating compressor efficiency by constructing an efficiency estimation function for a flow rate of intake air passing through a compressor, a rotational speed of the compressor, a temperature of intake air upstream of the compressor, and a pressure of intake air upstream of the compressor of the status information;
   estimating a compressor power minimum value by substituting the compressor efficiency into a compressor power function reflecting the flow rate of the intake air passing through the compressor, the temperature of the exhaust gas upstream of the turbine, and the temperature of the exhaust gas downstream of the turbine of the status information;
   estimating a base boost pressure via an inverse function of the compressor power function assuming that the turbine power minimum value and the compressor power minimum value are equal;
   after estimating the base boost pressure, determining that an overboost has occurred when the base boost pressure exceeds a target boost pressure; and
   performing overboost preventing control, when the overboost occurs, to reduce the base boost pressure by controlling an amount of opening of a throttle valve to place a turbocharger in a controllable region.

8. The method of claim 7, wherein
   the estimating of the turbine power minimum value includes
   determining the turbine power minimum value when a vane of a turbocharger is maximally open and a turbocharger boost pressure is smallest.

* * * * *